Jan. 26, 1926.

J. W. DIXON 1,570,665

CUTTING MACHINE

Filed June 27, 1921

JAMES W. DIXON
INVENTOR

BY Hadley H. Freeman
ATTORNEY

Jan. 26, 1926.
J. W. DIXON
1,570,665
CUTTING MACHINE
Filed June 27, 1921
2 Sheets-Sheet 2
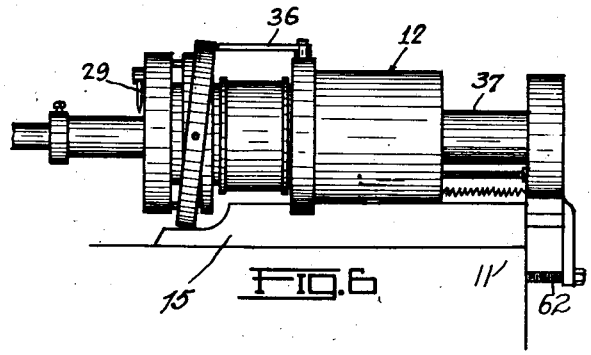
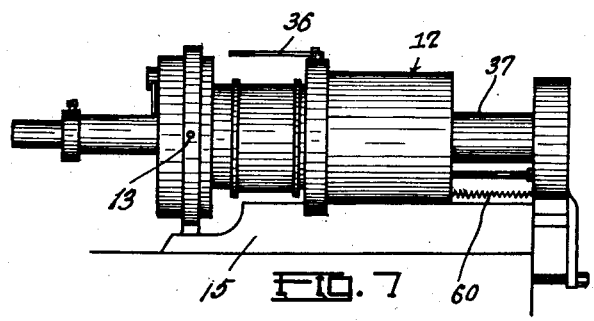
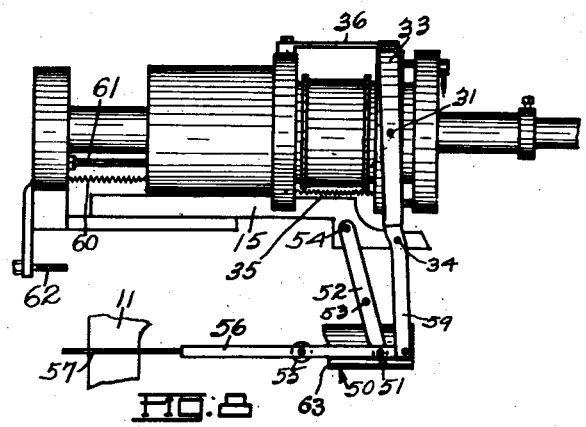
JAMES W. DIXON
INVENTOR
BY
ATTORNEY Patented Jan. 26, 1926.

1,570,665

UNITED STATES PATENT OFFICE.

JAMES W. DIXON, OF CHICAGO, ILLINOIS, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

CUTTING MACHINE.

Application filed June 27, 1921. Serial No. 480,859.

*To all whom it may concern:*

Be it known that I, JAMES W. DIXON, a citizen of the United States, and a resident of Chicago, in the county of Cook and State of Illinois, have invented certain new and useful Improvements in Cutting Machines, of which the following is a specification.

My invention relates to cutting machines especially adapted for cutting rubber tubing and the principal object of my invention is to provide a new and improved machine of this type. In the drawings accompanying this specification and forming a part thereof I have shown, for purposes of illustration, one form which my invention may assume. In these drawings:

Figure 6 is a view of the cutter head in the position in which the tube has been clamped, Figure 7 is a view of the cutter head in cutting position, while Figure 8 is a reverse side view of the cutting head and its operating mechanism, certain portions of the frame being broken away.

Figure 1:
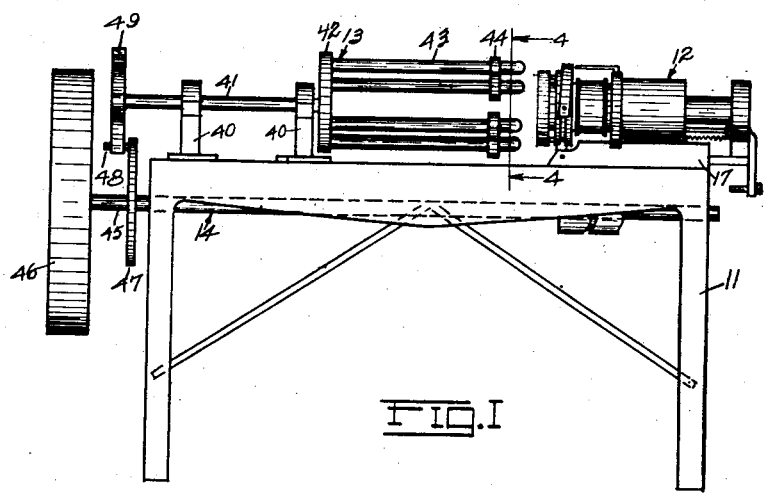
Figure 1 represents a side elevation of this illustrative machine.
Figure 2:
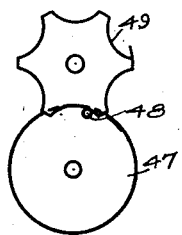
Figure 2 is a detail of the finger advancing mechanism.
Figure 3:
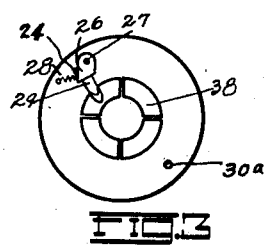
Figure 3 is a detail of the cutting mechanism.
Figure 4:
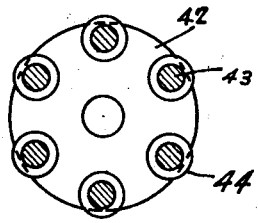
Figure 4 is a section on the line 4—4 of Figure 1.
Figure 5:
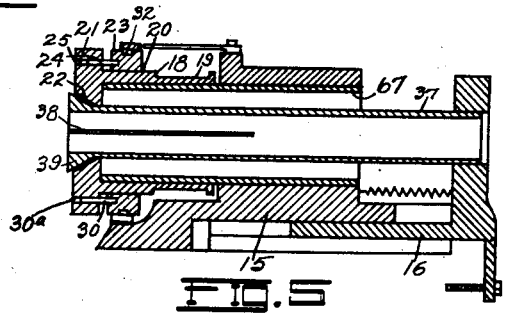
Figure 5 is a vertical section through the cutter head.

The machine herein described comprises a frame 11 carrying cutting mechanism 12, positioning and conveying mechanism 13, and driving mechanism 14. The cutting mechanism 12 comprises a pair of slides 15 and 16 each mounted in guideways in a block 17 secured to the table 11. The slide 15 carries a bearing tube 67 on which rotates a unit 18 comprising a pulley 19 an intermediate section 20 and a disc 21. The disc 21 is provided with an interior beveled annulus 22 while the intermediate section 20 carries a ring 23, which is slidably mounted thereon and carries a pin 24 extending through an aperture 25 in the disc 21 and provided with a beveled end adapted to engage the beveled surface of a carrier 26 which is pivoted to the disc 21 at 27, is spring pressed against the pin 24 by a spring 28, and carries a cutting knife 29. The ring 23 is rotated by the disc 21 by means of the pin 24 and a second similar pin 30 extending into aperture 30ª and is controlled in its longitudinal movement by a pair of pins 31 riding in a groove 32 of the ring 23 and carried by a yoke 33 which is pivoted at 34 to the slide 15, is spring pressed by the spring 35, and is limited in its movement by a stop 36 carried by the slide 15. The slide 16 carries a tube guide 37 adapted to receive the tube which is to be cut, split at its free end as shown at 38, and provided at this free end with a beveled annulus 39 adapted to co-operate with the beveled annulus 22 on the disc 21.

The table 11 carries at its opposite end a pair of bearings 40 supporting a shaft 41 on which is mounted a disc 42 carrying a plurality of fingers 43 each of which carries an adjustable collar 44 and may be positioned in front of the opening in the tube guide 37.

The unit 18 is rotated by means of a belt engaging the pulley 19. The remaining mechanism is operated by means of the operating mechanism 14 which comprises a shaft 45 operated by a belt driven pulley 46 and carrying a disc 47 on which is mounted a pin 48 adapted to engage and operate the star wheel 49 on the finger carrying shaft 41. The main drive shaft 45 also carries a table cam 50 consisting of a groove cam 51 and a face cam 63. This groove cam 51 is engaged by a pin on a lever 52 which is pivoted centrally at 53 to the frame 11 and at its other extremity is connected by a pivot 54 to the slide 15. The face cam 63 is adapted to engage a roller 55 carried by a slide 56 resting at one end in an aperture 57 in the frame 11 and pivoted at the other end to the extension 59 of the yoke 33. The slide 15 is connected to the slide 16 by means of the tension spring 60 and the slide 15 also carries a stud 61 adapted to engage the slide 16 while the slide 16 carries a stud 62 adapted to engage the main frame 11.

In operation, the parts being in the position shown in Figure 1 and with one of the fingers positioned opposite the aperture in the tube guide 37, rotation of the main shaft 45 will cause rotation of the cam 50 to thereby swing the lever 52 about the pivot 53 and thus advance the slide 15 and the part carried thereby. During this advance, through the action of the spring 60 connecting the slides 15 and 16, the slide 16 and the parts carried thereby will be carried forward concurrently with the slide 15 and the parts carried thereby until the stud 62 encounters the frame 11 as shown in Figure 6 whereupon further advance movement of the slide 16 will be prevented and continued advance of the slide 15 will cause the beveled annulus 22 to ride over the beveled annulus 39 to thereby contract the tube guide 37 and in this manner grip the tube which the operator has, by hand, pushed through guide 37 and onto one of the fingers 43 and against collar 44 carried thereby. While slides 15 and 16 are held in the position shown in Figure 6 the face cam 63 engages the roller 55 to thereby swing the lever 59 and yoke 33 about the pivot 34 and in this manner force pin 24 into engagement with the knife carrier 26 to thereby cam the knife into engagement with the tube to thereby sever the section of the tube projecting beyond the plane of the knife. Continued rotation of the main shaft 45 thereupon permits the retraction of the yoke 33 and the resultant retraction of the knife 29 after which the cam 51 returns the slide 15 while the slide 15 communicates this return movement to the slide 16 by means of the stud 61. While the slides are in return position the further rotation of the main shaft 45 will cause the pin 48 to rotate the star wheel 49 and thereby position another finger before the aperture of the tube guide 37 whereupon the tube will be moved forward onto the new finger and the severed section of the tube will be removed from the preceding finger. The length of the cut is controlled by the position of the collars 44 which may be adjusted at will.

The disclosure herein is illustrative only and my invention is, of course, not limited thereto.

I claim:

1. A tube cutting machine comprising a hollow guide through which the tube is fed, a plurality of fingers successively positioned in alignment with the guide and receiving the tube as it passes therefrom, means to clamp the tube in the guide, means to sever the tube and means to move the fingers after the severing operation to carry the severed tube away from the cutter and position a second finger in alignment with the guide.

2. A tube cutting machine comprising a hollow guide, a rotating cutting head associated with the guide and clamping means, means to operate the clamp and cutting head to sever the tube and means to support the free end of the tube during the cutting operation, said means operable after the cutting operation to convey the severed tube section from the cutter.

3. A tube cutting machine comprising a hollow guide through which the tube is fed, a plurality of fingers successively positioned in alignment with said guide and receiving the tube as it passes therefrom, the fingers being provided with adjustable abutments to determine the length of tube to be severed, means to clamp the tube in the guide, means to sever the tube and means to move the fingers after the severing operation to carry the severed portion of the tube away from the cutter.

In testimony whereof I have signed my name to the above specification.

JAMES W. DIXON